(12) United States Patent
Ryuu

(10) Patent No.: US 9,948,819 B2
(45) Date of Patent: Apr. 17, 2018

(54) INFORMATION PROCESSING SYSTEM, INFORMATION PROCESSING APPARATUS, AND DATA PROCESS CONTROL METHOD

(71) Applicant: Bin Ryuu, Kanagawa (JP)

(72) Inventor: Bin Ryuu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/126,321

(22) PCT Filed: Mar. 13, 2015

(86) PCT No.: PCT/JP2015/058392
§ 371 (c)(1),
(2) Date: Sep. 15, 2016

(87) PCT Pub. No.: WO2015/141815
PCT Pub. Date: Sep. 24, 2015

(65) Prior Publication Data
US 2017/0085743 A1    Mar. 23, 2017

(30) Foreign Application Priority Data

Mar. 17, 2014 (JP) ................. 2014-052943

(51) Int. Cl.
*H04N 1/32* (2006.01)
*H04N 1/21* (2006.01)
(Continued)

(52) U.S. Cl.
CPC ..... *H04N 1/32432* (2013.01); *H04N 1/00209* (2013.01); *H04N 1/00244* (2013.01);
(Continued)

(58) Field of Classification Search
CPC .......... H04N 1/32432; H04N 1/00244; H04N 1/00209; H04N 1/217; H04N 1/4413; H04N 2201/0081
(Continued)

(56) References Cited

U.S. PATENT DOCUMENTS

2007/0282701 A1* 12/2007 Hirayama .............. G06Q 30/06
705/26.8
2008/0174817 A1* 7/2008 Nemoto ............. H04N 1/00411
358/1.15
(Continued)

FOREIGN PATENT DOCUMENTS

JP    2004-302972    10/2004
JP    2012-065006    3/2012

OTHER PUBLICATIONS

International Search Report dated Jun. 9, 2015 in PCT/JP2015/058392 filed on Mar. 13, 2015.
(Continued)

*Primary Examiner* — Allen H Nguyen
(74) *Attorney, Agent, or Firm* — Ipusa, PLLC

(57) ABSTRACT

Disclosed is an information processing system including one or more computers. The information processing system includes a first acquisition part configured to acquire data that are stored from a terminal apparatus into a predetermined storage via a network from the predetermined storage via the network, a second acquisition part configured to acquire parameter information based on the acquired data, a selector configured to select a data process to be executed, and a process information generator configured to generate process information serving as information for executing the data process based on the acquired data, the acquired parameter information, and the selected data process.

15 Claims, 13 Drawing Sheets

(51) Int. Cl.
*H04N 1/00* (2006.01)
*H04N 1/44* (2006.01)

(52) U.S. Cl.
CPC .......... *H04N 1/217* (2013.01); *H04N 1/4413* (2013.01); *H04N 2201/0081* (2013.01)

(58) Field of Classification Search
USPC ........................................................ 358/1.16
See application file for complete search history.

(56) References Cited

U.S. PATENT DOCUMENTS

| | | |
|---|---|---|
| 2009/0119601 A1 | 5/2009 | Adachi et al. |
| 2009/0161158 A1* | 6/2009 | Fujikawa ............... H04L 51/066 358/1.15 |
| 2011/0051178 A1* | 3/2011 | Kono ................. H04N 1/00416 358/1.15 |
| 2012/0002238 A1 | 1/2012 | Ito et al. |
| 2012/0096348 A1* | 4/2012 | Nagamine .......... H04N 1/00222 715/273 |
| 2013/0013662 A1 | 1/2013 | Masuda |
| 2013/0246923 A1 | 9/2013 | Iwai et al. |
| 2014/0129607 A1* | 5/2014 | Nagumo ............. H04L 41/5048 709/201 |

OTHER PUBLICATIONS

Unakami Shinobu, "Automator, Mac fan", Aug. 1, 2010 vol. 18, No. 8 pp. 104-111.
Extended European Search Report dated Feb. 17, 2017.

* cited by examiner

FIG.8

| CLOUD STORAGE NAME | ACCOUNT NAME | PASSWORD | FLOW ID | ... |
|---|---|---|---|---|
| gggDoc | aaa@xxx.com | ... | flow1 | ... |
| gggDoc | bbb@xxx.com | ... | flow2 | ... |
| : | : | : | : | : |

FIG.10

| EMPLOYEE'S NUMBER | NAME | DEPARTMENT NAME | MAIL ADDRESS | SUPERIOR'S ID |
|---|---|---|---|---|
| ... | ... | ... | ... | ... |
| ... | ... | ... | ... | ... |
| ... | ... | ... | ... | ... |
| .. | .. | .. | .. | .. |

FIG.11

| FLOW ID | FILE NAME | EXTENSION | UPLOAD DATE AND TIME | EMPLOYEE'S NUMBER | DEPARTMENT NAME | NAME | MAIL ADDRESS | SUPERIOR'S ID | PATH NAME |
|---|---|---|---|---|---|---|---|---|---|
| flow1 | blueprint | jpeg | 2013/10/26 | ... | ... | ... | ... | ... | ... |
| | | | | | | | | | ... |

INFORMATION PROCESSING SYSTEM, INFORMATION PROCESSING APPARATUS, AND DATA PROCESS CONTROL METHOD

TECHNICAL FIELD

The disclosures discussed herein relate to an information processing system, a data process control method, and a non-transitory computer-readable recording medium storing a data process control program.

BACKGROUND ART

The related art technologies (e.g., Japanese Laid-open Patent Publication No. 2012-065006, hereinafter referred to as "Patent Document 1") disclose computer systems that execute a preset process flow or a preset workflow on image data of a document scanned by an image forming apparatus to deliver the executed result to predetermined delivery destinations.

Meanwhile, electronic files may be saved over a network utilizing storage services on the network, such as a cloud storage or the like. The convenience of the above-described computer systems may be improved when users are able to simply input data such as the electronic files stored in the above-described storage services as a process target of a data process (e.g., workflow) to be executed in the computer systems.

SUMMARY OF THE INVENTION

Problems to be Solved by the Invention

Accordingly, it is a general object in one embodiment of the present invention to provide a technology capable of improving the convenience of a data process performed on data stored in a storage over a network that substantially obviates one or more problems caused by the limitations and disadvantages of the related art.

Means for Solving the Problems

According to an aspect of the present invention, there is provided an information processing system including one or more computers. The information processing system includes a first acquisition part configured to acquire data that are stored from a terminal apparatus into a predetermined storage via a network from the predetermined storage via the network; a second acquisition part configured to acquire parameter information based on the acquired data; a selector configured to select a data process to be executed; and a process information generator configured to generate process information serving as information for executing the data process based on the acquired data, the acquired parameter information, and the selected data process.

Effects of the Present Invention

According to embodiments of the present invention, there is provided a technology capable of improving the convenience of a data process performed on data stored in a storage over a network.

BRIEF DESCRIPTION OF THE DRAWINGS

FIG. 8 is a diagram illustrating a configuration example of a setting information storage;

FIG. 10 is a diagram illustrating a configuration example of information stored by a user information management server;

FIG. 11 is a diagram illustrating a configuration example of job information;

BEST MODE FOR CARRYING OUT THE INVENTION

In the following, a description is given of preferred embodiments with reference to accompanying drawings.

Figure 1:
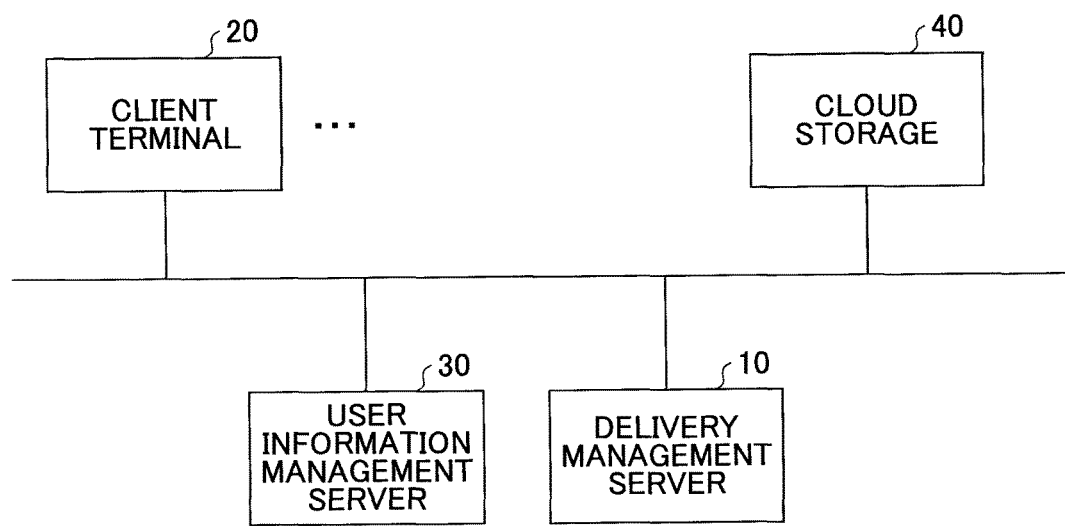
FIG. 1 is a diagram illustrating a configuration example of a delivery management system in an embodiment.

In the following, a description is given of embodiments with reference to accompanying drawings. FIG. 1 is a diagram illustrating a configuration example of a delivery management system according to an embodiment. In FIG. 1, a delivery management 1 includes a delivery management server 10, one or more client terminals 20, a user information management server 30, and a cloud storage d40. The above-described apparatuses and devices are connected via a network (regardless of wired or wireless network) such as a local area network (LAN) or the Internet such that these apparatuses and devices are able to communicate with one another.

The delivery management server 10 indicates a computer configured to execute a workflow set in advance in association with input data or the like. The workflow may, for example, indicate a flow (process flow), that may be implemented by a combination of one or more process units (tasks) each being configured to implement an independent or a sole complete function. The process unit may be applied to activity, the word used in a general workflow terminology. That is, the delivery management server 10 is configured to implement a function to execute a process on input data based on contents of data processes set (defined) in advance.

The client terminal 20 is configured to be directly used by a user. In this embodiment, the client terminal 20 is used for uploading files to the cloud storage 40, and saving files in a storage area of the cloud storage 40. The user uses the client terminal 20 to save in the cloud storage 40 data such as files subjected to execution to cause the delivery management server 10 to perform data processes. The client terminal 20 may, for example, be a mobile phone, smartphone, a tablet terminal, a personal computer (PC), and the like.

The cloud storage 40 may be called an "online storage" that serves as a computer system configured to provide a service a (storage service) that lends a storage area for saving data over the Internet. In this embodiment, files uploaded in the cloud storage 40 serve as input data of a workflow executed by the delivery management server 10. Note that the cloud storage 40 is an example of the storage service, and it is not mandatory for the delivery management system 1 to provide a data saving storage. That is, the cloud storage 40 is an example of an apparatus having a storage area (storage part) of an acquisition destination from which the delivery management server 10 attempts to acquire data via a network.

The user information management server 30 is a computer configured to manage attribute information (hereinafter called "user information") of each of users of the delivery management server 10. For example, a lightweight directory access protocol (LDAP) server may be used as the user information management server 30.

Note that a target from which the delivery management server 10 receives data to be processed or a target to which the delivery management server 10 outputs the processed data is not limited to the cloud storage 40. For example, the delivery management system 1 may include an image forming apparatus that reads images from a document, a mail server that transfers electronic mail, a file server used for sharing files on a local area network (LAN), and the like as a data input source with respect to the workflow, or a data output destination (delivery destination). In this case, the delivery management server 10 is connected to those apparatuses via a network.

Note that in an embodiment of the delivery system 1, the delivery management server 10 and the user information management server 30 may be disposed in a user's workplace, a client terminal 20 may be disposed in the user's house, and the cloud storage 40 may be disposed on a cloud. For example, it is assumed that an internal network of the user's workplace is provided with a firewall to restrict accesses from an external network of the user's workplace, and hence, access to the internal network of the user's workplace is restricted from the client terminal 20 disposed in the user's house. In this case, when the user attempts to access the delivery management server 10 and the user information management server 30 from the client terminal 20 in the user's house, the client terminal 20 is not permitted to have an access to the delivery management server 10 and the user information management server 30. Similarly, when the user attempts to access the internal network of the user's workplace from the cloud storage 40, the access to the internal network of the user's workplace may be restricted. In this case, it may be possible for the client terminal 20 to communicate with the delivery management server 10 and the user information management server 30 by accessing the internal network of the user's workplace (the delivery management server 10 or the user information management server 30) from the external network of the user's workplace. However, the user who attends to the user's work place needs to know the client terminal 20 used in the user's house or all the client terminals 20 used outside the workplace. Accordingly, it may be possible to improve the convenience of a data process when executing a process flow inside the user's workplace on the data obtained as a result of the user's work outside the user's workplace. Note that the above-described embodiment is only an example, which does not limit the scope of the claims of the present invention. Thus, the above-described embodiment may be altered or modified into other configurations.

Figure 2:
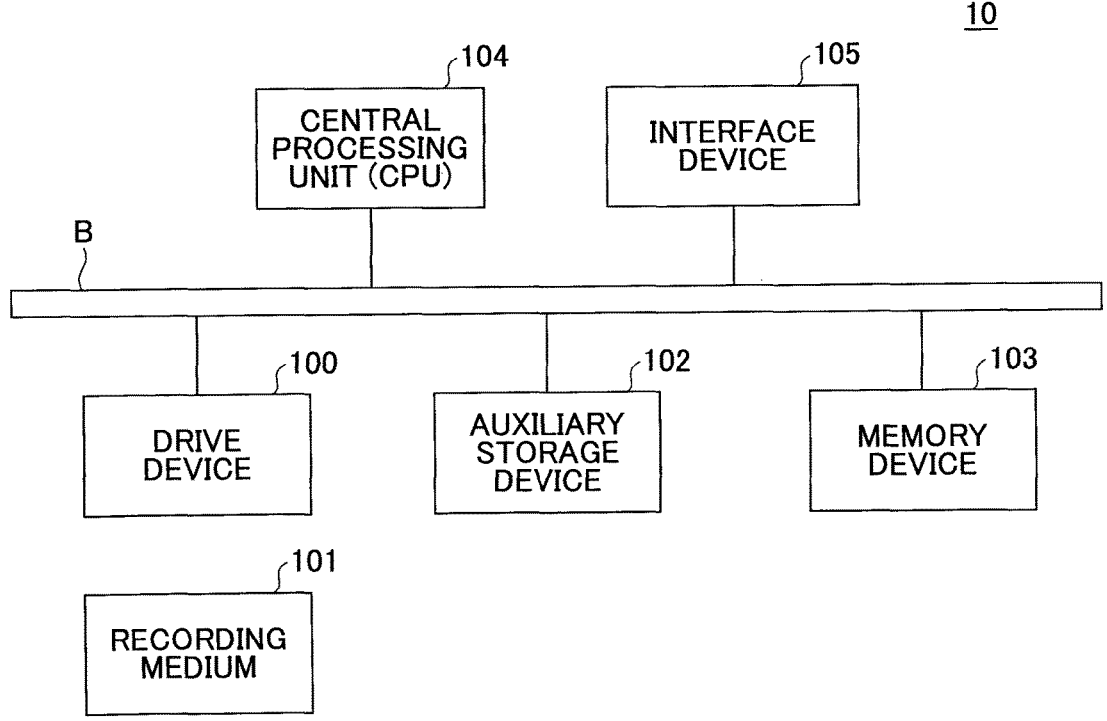
FIG. 2 is a diagram illustrating a hardware configuration example of a delivery management server in an embodiment.

FIG. 2 is a diagram illustrating a hardware configuration example of the delivery management server according to an embodiment. The delivery management server 10 of FIG. 2 includes a drive device 100, an auxiliary storage device 102, a memory device 103, a CPU 104, and an interface device 105 that are connected to one another via a bus B.

Programs implementing processes in the delivery management server 10 are provided in a form of a recording medium 101 such as a CD-ROM. When the recording medium 101 storing the programs is set in the drive device 100, the programs are installed from the recording medium 101 into the auxiliary storage device 102 via the drive device 100. Note that the programs are not necessarily installed from the recording medium 101, and may be downloaded from another computer via a network. The auxiliary storage device 102 is configured to store the installed programs as well as storing necessary files, data, and the like.

The memory device 103 is configured to read the programs from the auxiliary storage device 102 and store the read programs when receiving instructions to activate the programs. The CPU 104 is configured to implement functions associated with the delivery management server 10 in accordance with the programs stored in the memory device 103. The interface device 105 is configured to serve as an interface for connecting the delivery management server 10 to a network.

Note that the delivery management server 10 may be composed of two or more computers.

Figure 3:
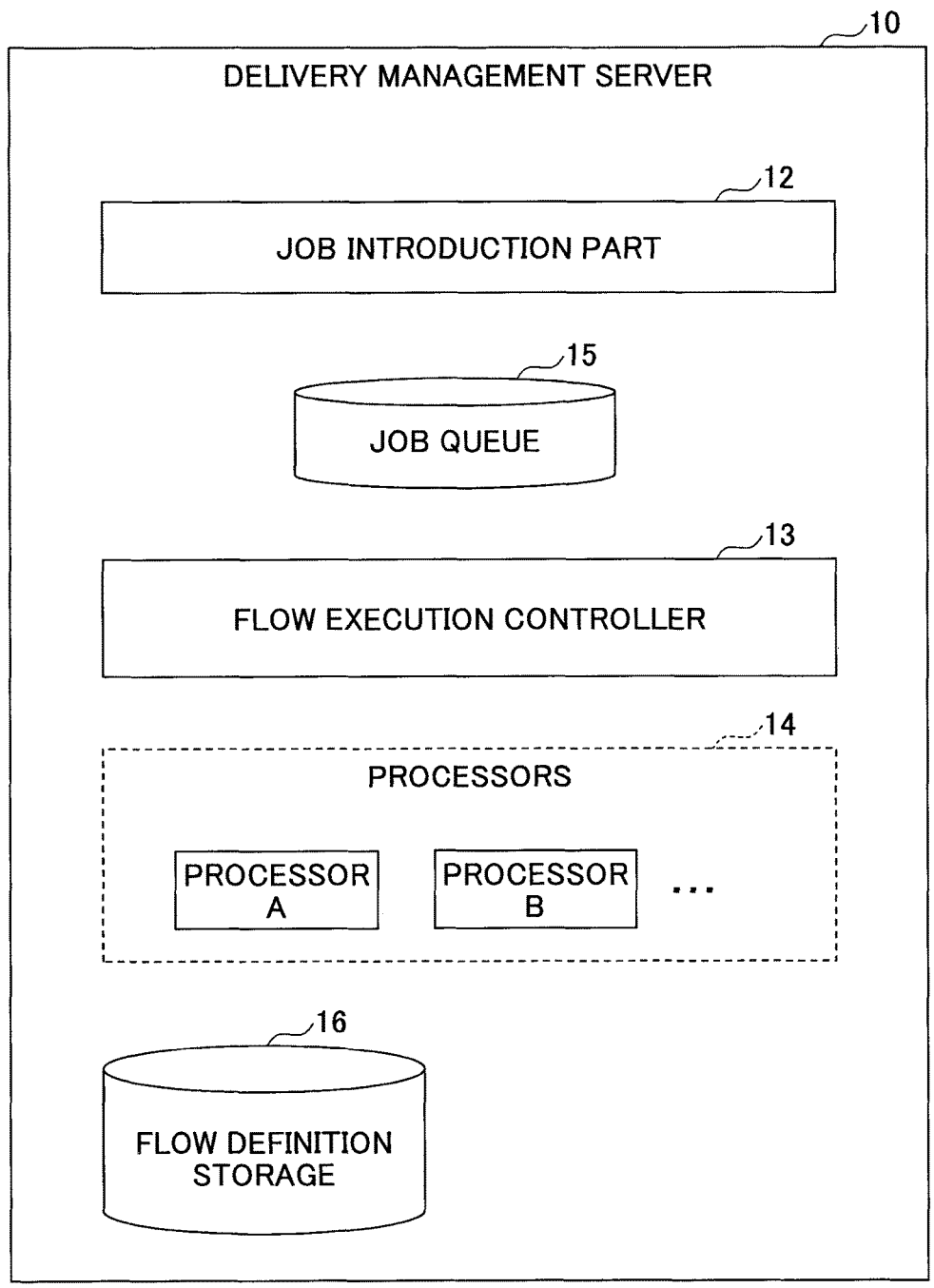
FIG. 3 is a diagram illustrating a first functional configuration example of the delivery management server in the embodiment.

FIG. 3 is a diagram illustrating a first functional configuration example of the delivery management server in the embodiment. In FIG. 3, the delivery management server 10 includes a job introduction part 12, a flow execution controller 13, and a processor 14. The above-described components may be implemented by programs installed in the delivery management server 10 that cause a CPU 104 to execute processes. The delivery management server 10 may also utilize storage parts such as a job queue 15 and a flow definition storage 16. These storage parts may be implemented by utilizing a storage device and the like that are connected, for example, to the auxiliary storage device 102 or the delivery management server 10 via a network. The job queue 15 may be composed of the memory device 103.

The flow definition storage 16 is configured to store flow definition data. The flow definition data record definition information related to a workflow process. In this embodiment, one set of flow definition data corresponds to one workflow. Hence, the flow definition data are created for each of the workflows having different process orders from one another.

The job introduction part 12 is configured to introduce job information associated with the workflow into the job queue 15 in response to a workflow execution request. In this embodiment, a job indicates an execution unit of the workflow. For example, in a case where the identical workflow is executed two or more times, a different job is created every time the identical work flow is executed. Note that the job information includes a format or a structure that may be translated by the flow execution controller 13.

The job queue 15 is configured to record the introduced job information. The job information may, for example, include an identifier of the workflow subject to execution or data subjected to processing.

The flow execution controller 13 is configured to acquire job information from the job queue 15 to control the execution of the workflow corresponding to the acquired job information in accordance with the flow definition data.

The processor 14 is configured to execute a process for each processing unit (activity) forming the workflow. For example, one activity is implemented by one processor 14. Accordingly, the workflow is implemented by connecting processes having different process contents performed by one or more processors 14. FIG. 3 illustrates examples of processors A and B as the different processors 14. The respective processors 14 may be implemented by respective individual program modules. In such a case, each of the program modules may be easily installed as a plugin.

Details of the flow definition data are described below. In this embodiment, one or more process units forming a workflow are roughly divided into an intermediate process and an output process. The intermediate process may, for example, indicate an engineering process on data subjected to execution of the workflow process. Examples of the intermediate process include a denoising process, an optical character recognition (OCR) process, a translation process, and a data conversion process.

The output process may indicate an output process of data from the workflow. An example of the output process includes a delivery process to a file server to be connected via a network. Further, a delivery destination may be a predetermined mail address or the cloud storage 40. Note that the output process, such as a print process addressed to an image forming apparatus or a display process addressed to a projector, other than the delivery process may form the workflow.

The flow definition data are configured to record a definition associated with a combination of at least one output process and optional one or more intermediate processes that are sequentially ordered. The flow definition data may define a workflow such that branched processes are executed in parallel.

Figure 4:
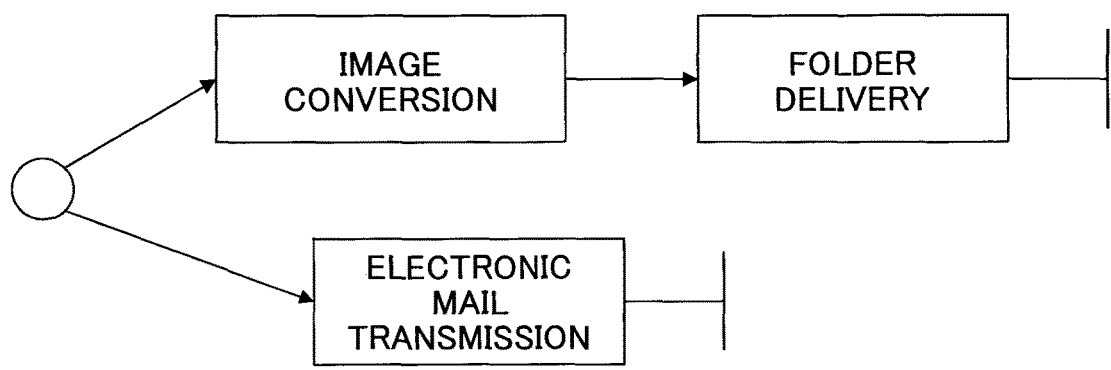
FIG. 4 is a diagram illustrating an example of a workflow.

FIG. 4 is a diagram illustrating one example of the workflow. FIG. 4 illustrates one workflow that executes a process of delivering to a folder image data obtained after the image conversion process is executed with respect to input image data, and a process of transmitting the input image data via an electronic mail in parallel. The flow definition data may, for example, include the definition of the workflow illustrated in FIG. 4, and the identifier of the workflow (hereinafter called a "flow ID").

Figure 5:
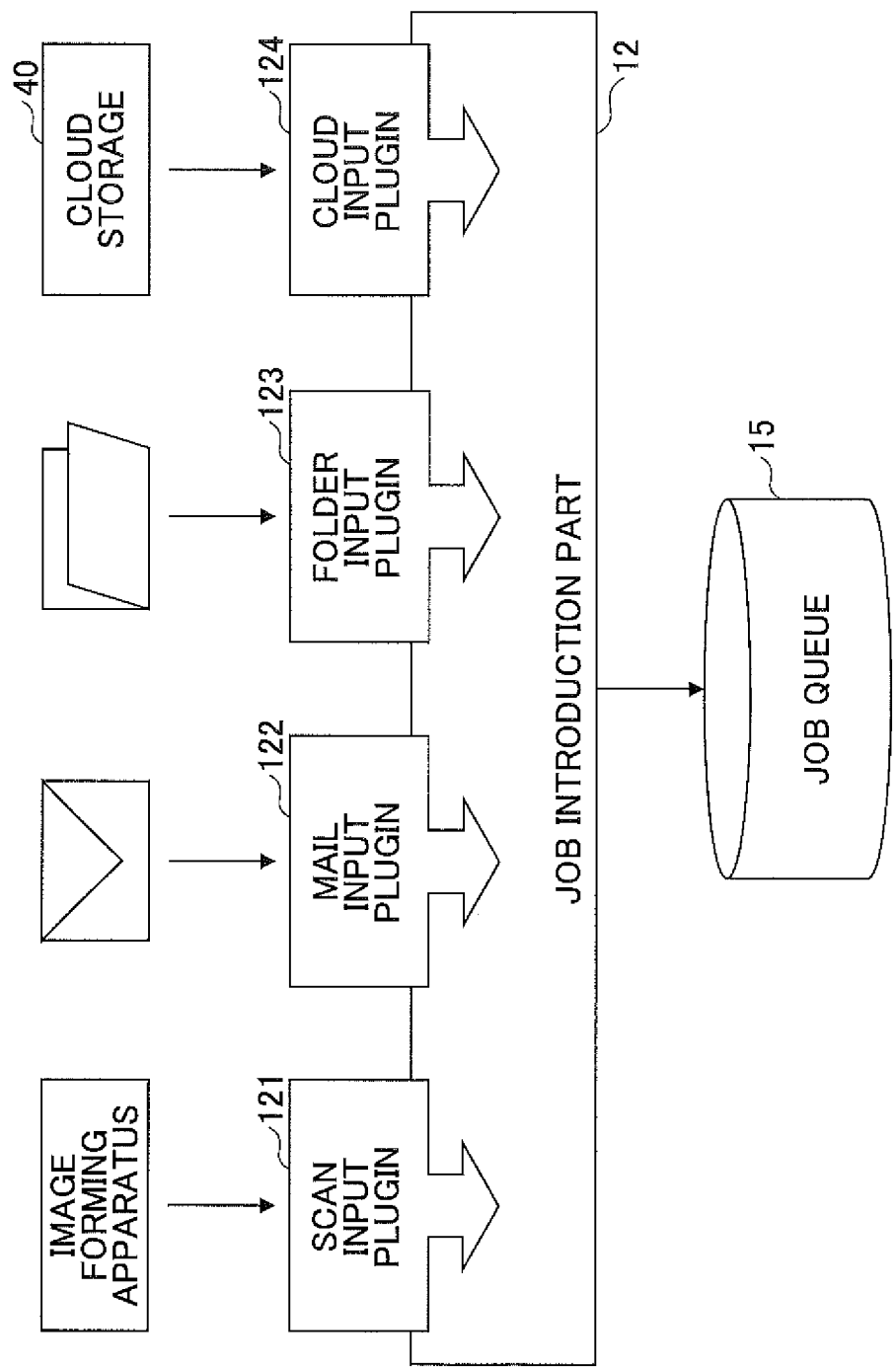
FIG. 5 is a diagram illustrating a configuration example of a job introduction part.

Subsequently, details of the job introduction part are described. FIG. 5 is a diagram illustrating a configuration example of the job introduction part.

The job introduction part 12 is configured to implement data communications by the plugin capable program. FIG. 5 illustrates examples of a scan input plugin 121, a mail input plugin 122, a folder input plugin 122, and a cloud input plugin 124.

The scan input plugin 121 is configured to receive the workflow execution request from an image forming apparatus. That is, the scan input plugin 121 receives, from the image forming apparatus, the workflow execution request with respect to the image data that are scanned in the image forming apparatus. The workflow execution request specifies the image data; the flow ID, and setting values for the workflow, and the like. The scan plugin 121 is configured to convert the received flow ID, image data, setting values, and the like into job information in accordance with formats predetermined by the flow execution controller 13, and store the job information into the job queue 15.

The mail input plugin 122 is configured to receive the workflow execution request via an electronic mail addressed to a predetermined mail address. In this case, the data attached to the electronic mail is subject to undergoing the workflow process. The data may be image data or other forms of data. The mail input plugin 122 is configured to receive the electronic mail addressed to the predetermined mail address from the mail server. The mail input plugin 122 is configured to convert the data attached to the acquired electronic mail, and information described in the electronic mail into job information in accordance with the predetermined format predetermined by the flow execution controller 13, and store the job information into the job queue 15.

The folder input plugin 123 is configured to receive the workflow execution request via a file uploaded in the predetermined folder. The predetermined folder may be a folder formed in the auxiliary storage device 102 of the delivery management server 10, or a folder formed in a storage device (e.g., a folder in any one of the client terminals 20 or a storage device of the file server) connected to the delivery management server via a network. The folder input plugin 123 may perform polling on (periodically referring to) the predetermined folder, and acquire, when a file storing data subject to processing (hereinafter referred to as a "data file"), and a file storing the flow ID, the setting values, and the like (hereinafter referred to as a "document file") are saved in this folder, the data file and the document file. The folder input plugin 123 is configured to convert the acquired data file, and information stored in the acquired document file into job information in accordance with the predetermined format predetermined by the flow execution controller 13, and store the job information into the job queue 15.

The cloud input plugin 124 is configured to receive the workflow execution request via a file uploaded in the cloud storage 40. The cloud input plugin 124 is configured to perform polling on a storage area (e.g., a folder) with respect to a predetermined account in the cloud storage 40, and acquire, when a file is saved in the storage area, the file. The cloud input plugin 124 is configured to convert the acquired file, and the document information of the file into job information in accordance with formats predetermined by the flow execution controller 13, and store the job information into the job queue 15.

Hence, the job introduction part 12 may be able to receive the workflow execution request in various configurations as described above. In addition, the job introduction part 12 may be able to receive the workflow execution request in configurations other than those described above by adding other plugins. For example, the job introduction part 12 may include a plugin configured to receive the workflow execution request via a web page.

Figure 6:
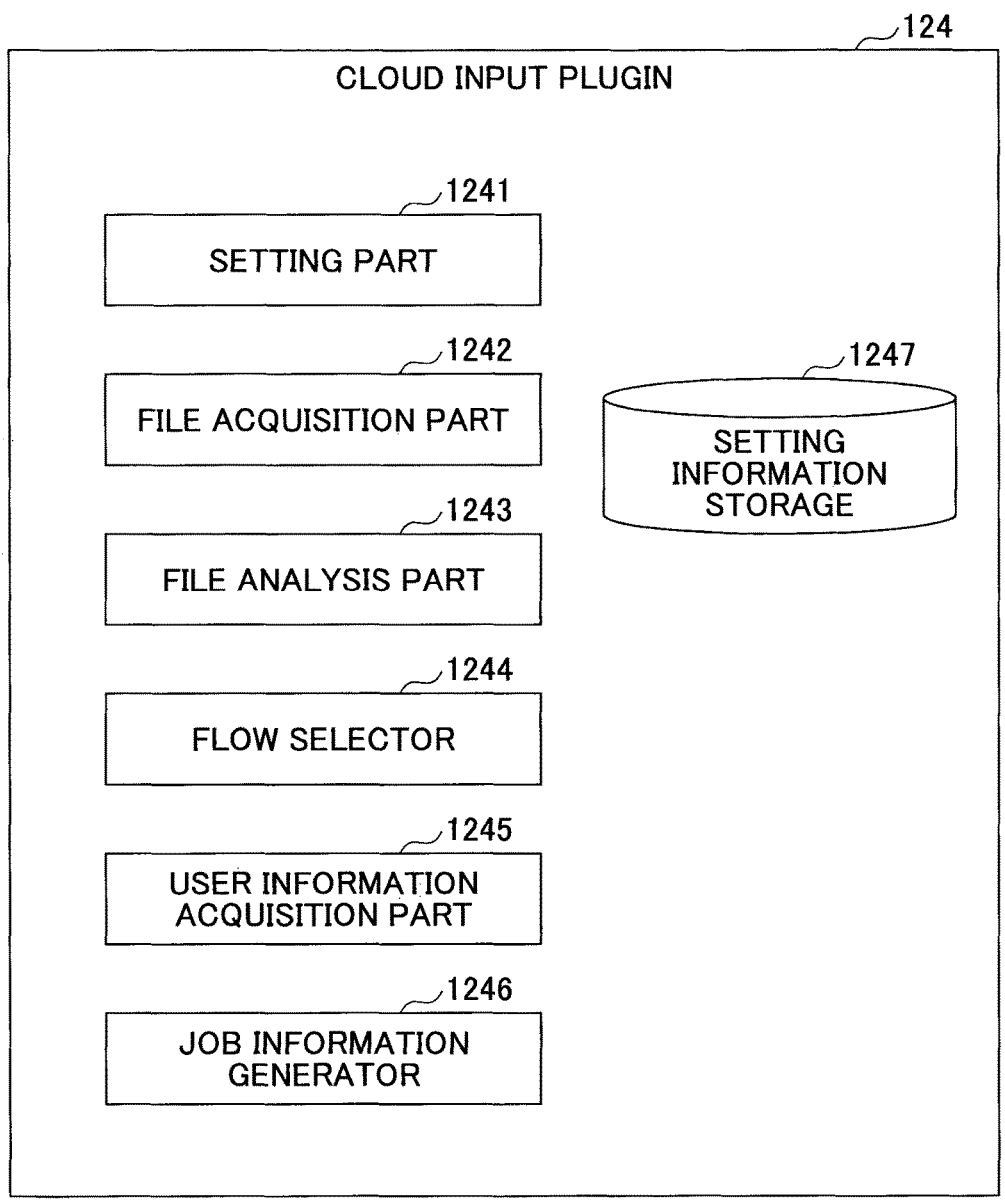
FIG. 6 is a diagram illustrating a functional configuration example of cloud input plugin.

The cloud input plugin 124 is described further in detail. FIG. 6 is a diagram illustrating a functional configuration example of the cloud input plugin.

As illustrated in FIG. 6, the cloud input plugin 124 is configured to cause a central processing unit (CPU) 104 of the delivery management server 10 to function as a setting part 1241, file acquisition part 1242, a file analysis part 1243, a flow selector 1244, a user information acquisition part 1245, and a job information generator 1246.

The setting part 1241 is configured to receive setting information input with respect to the cloud input plugin 124, and store the setting information in a setting information storage 1247. The setting information storage 1247 may be implemented by utilizing a storage device, and the like that are connected, for example, to the auxiliary storage device 102 or the delivery management server 10 via a network.

The file acquisition part 1242 is configured to communicate with the cloud storage 40 to monitor presence or absence of uploaded files with respect to the cloud storage 40 subject to monitoring. The file acquisition part 1242 is configured to acquire (download) a file when the file relating to a monitoring target is uploaded (e.g., the cloud storage 40 subject to monitoring). Information to identify the monitoring target is included in the setting information stored in the setting information storage 1247. Note that two or more monitoring targets may be set. Note that in this embodiment, the flow ID may be specified based on the cloud storage 40 serving as a storage destination for storing the file, and an account used for storing the file. Note that the flow ID may be specified based on a folder name of the folder of the storage destination for storing the file, a filename, or the like.

The file analysis part 1243 is configured to extract document information from the file acquired by the file acquisition part 1242. The document information may, for example, include a filename, a (filename) extension, an employee's number of the user's workplace, and the like. The employee's number is included in the filename. In other words, the user uploading a file in the cloud storage 40 uploads the file having a filename with his or her employee's number (e.g., a file accompanied with the employee's number following a five digit-rule header of the filename). Note that information other than the employee's number may be used as identification information for identifying each user. Hence, the file analysis part 1243 is configured to handle the information acquired from the filename in accordance with a predetermined rule as user identification information.

The flow selector 1244 is configured to select a workflow to be executed on the file based on an acquisition destination from which the file acquisition part 1242 acquires the file, or the document information of the file. That is, the flow ID of the workflow to be executed is specified by the flow selector 1244.

The user information acquisition part 1245 is configured to acquire user information from the user information management server 30. The user information is stored in the user management server 30 in association with an employee's number extracted from the filename by the file analysis part 1243.

The job information generator 1246 is configured to generate job information including the flow ID, the document information of a file, the file, and user information, and store the job information into the job queue 15.

Figure 7:
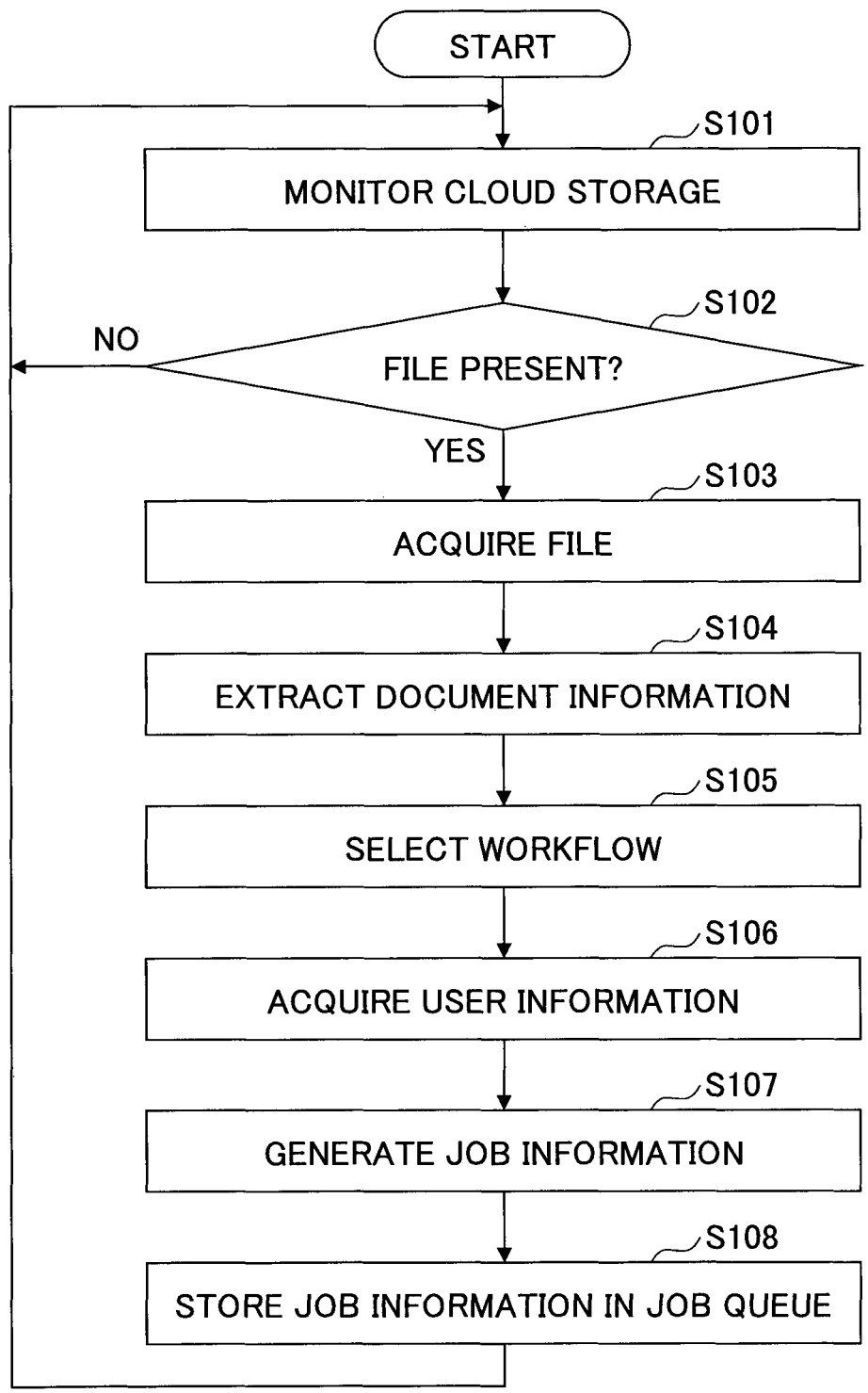
FIG. 7 is a flowchart illustrating an example of a process of receiving a workflow execution request via a cloud storage.

In the following, a description is given of a process executed by the delivery management server 10. FIG. 7 is a flowchart illustrating an example of a process of receiving a workflow execution request via the cloud storage 40.

The file acquisition part 1242 monitors presence or absence of an uploaded file with respect to the cloud storage 40 subject to monitoring (step S101). The monitoring target may, for example, be specified on the basis of information stored in the setting information storage 1247.

FIG. 8 is a diagram illustrating a configuration example of the setting information storage 1247. In FIG. 8, the setting information storage 1247 is configured to store a cloud storage 40 name, an account name, a password, a flow ID, and the like for each of the monitoring targets. The cloud storage 40 name includes identification information or address information of the cloud storage 40 to be monitored by the file acquisition part 1242. The account name is a name of the account used for accessing the cloud storage 40 name. The password is assigned corresponding to the account.

The flow ID is an ID of the workflow to be executed in association with a file uploaded with the account in the cloud storage 40. That is, in the present embodiment, the workflow is associated with the cloud storage 40 and its account. Note that the setting information storage 1247 may register two or more records. For example, two or more cloud storages 40 and their accounts are set as monitoring targets, and different flow IDs are assigned to the cloud storages 40 and their accounts. In this case, the file acquisition part 1242 is configured to monitor two or more accounts of the cloud storages 40. The user may operate the client terminal 20 to execute a desired workflow by uploading a file with the account corresponding to the workflow in the cloud storage 40 corresponding to the workflow.

In the example of FIG. 8, items of the account name and the flow ID are provided separately. However, the item of the account name may include the item of the flow ID.

Figure 9:
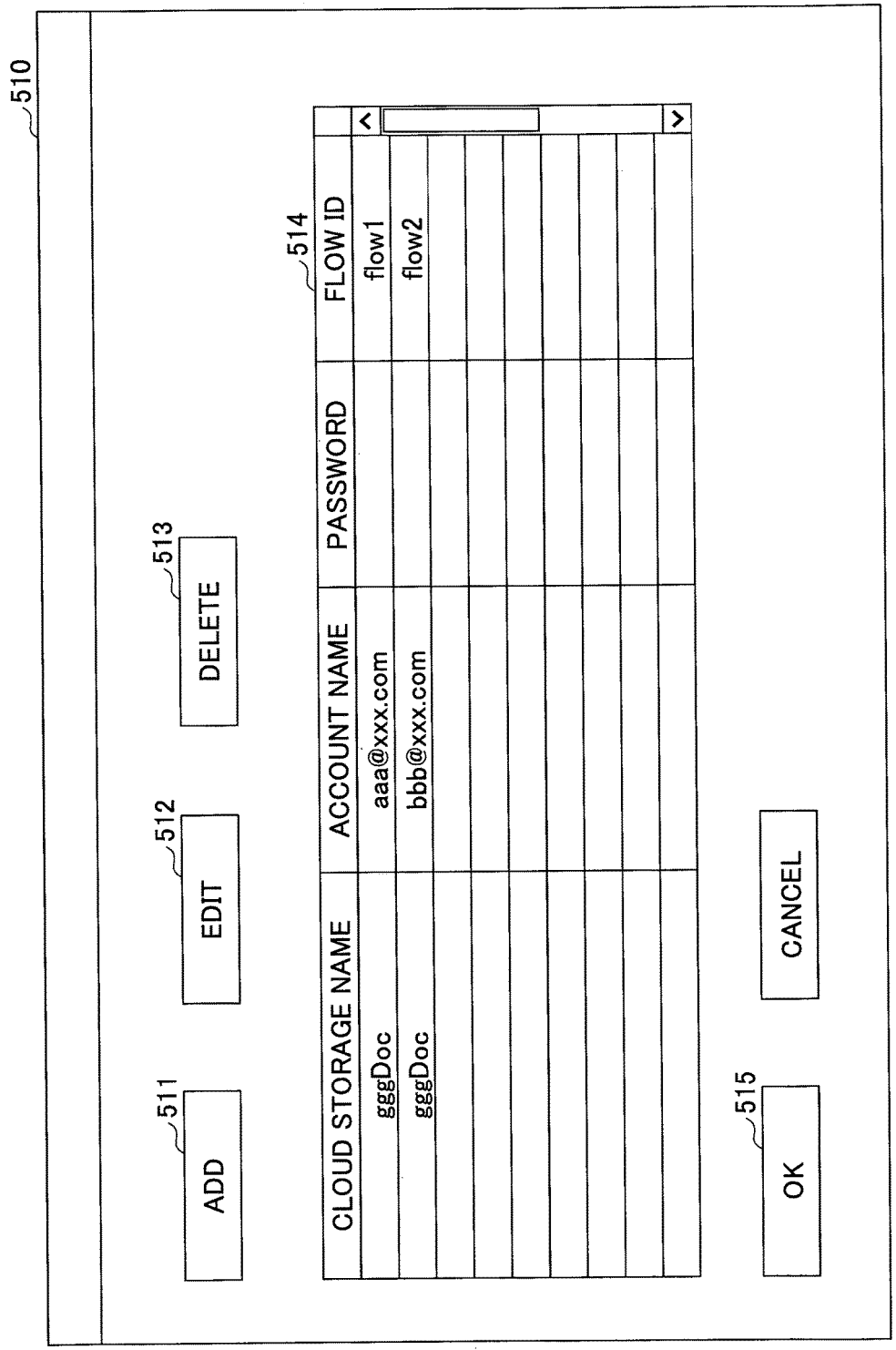
FIG. 9 is a diagram illustrating a display example of a setting screen.

Note that the setting information may be set via a setting screen illustrated in FIG. 9. FIG. 9 is a diagram illustrating a display example of the setting screen. The setting screen 510 illustrated in FIG. 9 includes an "ADD" button 511, an "EDIT" button 512, a "DELETE" button 513, a setting list 514, an "OK" button 515, and the like.

The setting list 514 presents a list of setting information stored in the setting information storage 1247. When the user depresses the "ADD" button 511, a dialog (hereinafter referred to as an "editing dialog") for inputting the cloud storage 40 name, the account name, the password, and the flow ID is displayed. When respective values are input into the items via the editing dialog, setting information including the values is added to the setting list 514.

When the user selects any one of rows including the setting information of the setting list 514, the user may operate the "EDIT" button 512 and the "DELETE" button 513. When the user depresses the "EDIT" button 512, an editing dialog having a value of the setting information associated with the selected row set as an initial value is displayed. When any one of the values of items is changed via the editing dialog, the changed value is reflected in the setting information associated with the selected row. When the user depresses the "DELETE" button 513, the selected row is deleted.

When the user depresses the "OK" button 515, the contents of the setting list 514 are stored in the setting information storage 1247.

Note that the setting screen 510 may be displayed on the client terminal based on display data of the web page returned (transmitted) by the setting part 1241 in response to a request from the client terminal 20. In this case, the user who is allowed to operate (edit or delete the items) the setting screen 510 may be specified as an administrator or the like so as not to allow other users to edit or delete the setting items. In the above configuration, ordinary users (who are not the administrator) may be provided with a display function alone.

In step S101, the file acquisition part 1242 accesses the cloud storage 40, using the account name and the password corresponding to the cloud storage 40 having the setting information storage 1247 storing the cloud storage 40 name. When the access is successful, the file acquisition part 1242 verifies presence or absence of a file. In step S101, the above-described process is executed in parallel or in series on each of the monitoring targets registered in the setting information storage 1247.

When the file acquisition part 1242 detects that there is a file being uploaded in any one of the monitoring targets ("YES" in step S102), the file acquisition part 1242 acquires (downloads) the file from a corresponding one of the monitoring targets (step S103). At this time, the file acquisition part 1242 also acquires uploaded date and time (stored date and time) of the file. In the following illustration, it is assumed that one file is acquired (downloaded) for convenience. When two or more files are acquired, the process described below may be executed on each of the files. In the following, the acquired file is referred to as a "target file".

Subsequently, the file analysis part 1243 extracts a filename and an extension of the target file, and an employee's number of the user from the filename of the target file (step S104). Then, the flow selector 1244 selects the flow ID stored in the setting information storage 1247 in association with the monitoring target serving as an acquisition destination of the target file as a flow ID of a workflow to be executed on the target file (step S105). Subsequently, the user information acquisition part 1245 acquires user information corresponding to the employee's number from the user information management server 30 (step S106).

FIG. 10 is a diagram illustrating a configuration example of information stored by the user information management server 30. In FIG. 10, the user information management server 30 stores user information including an employee's number, a name, an affiliated department name, a mail address, and a superior's ID, for each of the users. Note that the user information may include other items of information.

The employee's number is an employee's number of the user. The name is a name of the user. The affiliated department name is a name of the department with which the user is affiliated. The mail address is a mail address of the user. The superior's ID is an employee's number of the user's superior. That is, the superior's ID is identification information for specifying user information of the user's superior.

Subsequently, the job information generator 1246 generates job information (step S107).

FIG. 11 is a diagram illustrating a configuration example of the job information. In FIG. 11, the job information includes a flow ID, a filename, an extension, an employee's name, an affiliated department name, a name, a mail address, a superior's ID, a path name, and the like. The flow ID indicates the flow ID selected in step S105. The filename and the extension indicate the filename and the extension extracted from the file in step S104. The upload date and time indicate the upload date and time acquired together with the file in step S103. The employee's number indicates the employee's number extracted from the filename in step S104. The affiliated department name, the name, the mail address, and the superior's ID indicate user information acquired in step S105. The path name indicates a location of a storage that stores the file acquired instep S103 in the delivery management server 10. For example, the file may be stored in the auxiliary storage device 102.

Note that the job information may be stored in a format such as an eXtensible Markup Language (XML) file, a Comma Separated Values (CSV) file, or in other formats.

Subsequently, the job information generator 1246 stores the job information in job queue 15 (step S108).

Steps subsequent to step S103 may be repeatedly executed every time a file is uploaded in any one of the monitoring targets.

Next, an illustration is given of a control process of the workflow based on the job information registered in the job queue 15.

Figure 12:
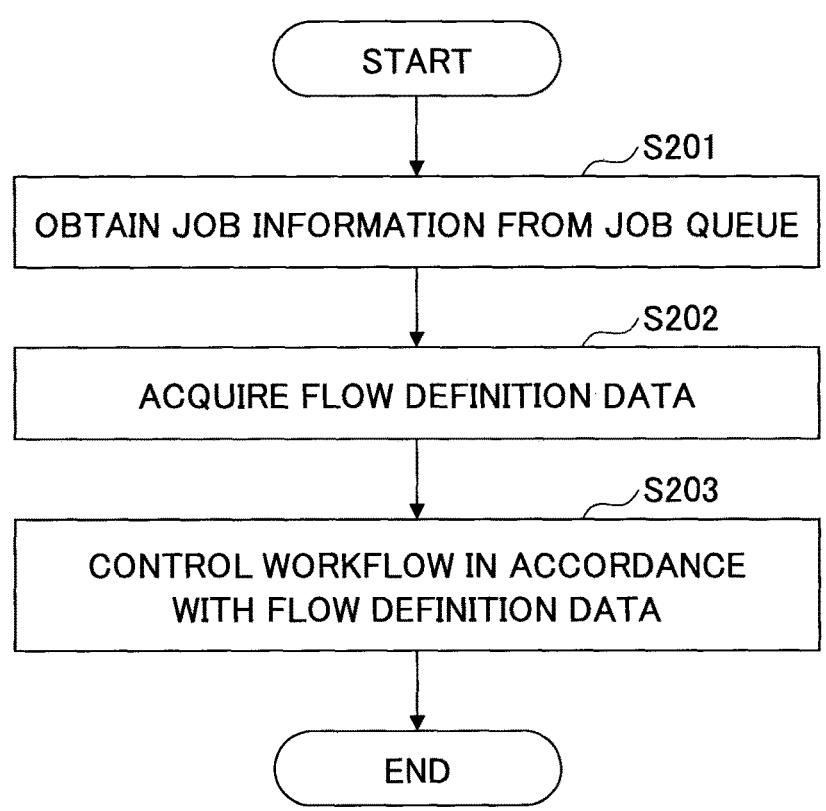
FIG. 12 is a flowchart illustrating an example of a control process of a workflow based on the job information.

FIG. 12 is a flowchart illustrating an example of a control process of a workflow based on the job information.

For example, the flow execution controller 13 periodically refers to the job queue 15, and when the flow execution controller 13 detects the job information being stored in the job queue 15, the flow execution controller 13 acquires the job information from the job queue 15 (step S201). Subsequently, the flow execution controller 13 acquires flow definition data corresponding to the flow ID included in the job information from the flow definition storage 16 (step S202).

Then, the flow execution controller 13 controls the execution of the workflow associated with the attached data included in the job information based on the acquired flow definition data (step S203). Specifically, when the flow definition data include a definition of the intermediate process, the flow execution controller 13 causes the processor 14 to execute the intermediate process. Further, the flow execution controller 13 causes the processor 14 associated with the output process to execute the output process defined in the flow definition data.

Note that the user information included in the job information may be used as parameters of the process control in the intermediate process or the output process. For example, the mail address of the superior specified based on the superior's ID may be set as the delivery destination. In addition, the mail address of the user may be set as the delivery destination. In this case, when a file is uploaded in the predetermined cloud storage 40, the user may be provided with a sense of an operation such as receiving, via an electronic mail, an execution result of the workflow (e.g., an OCR result) corresponding to the account used for the uploading.

As described above, according to the embodiment, the workflow execution request associated with the file may be input by uploading the file in the cloud storage 40. Accordingly, the files stored in the apparatus used by the user such as a mobile phone, a smartphone, a tablet terminal, or a personal computer (PC) may be used as input data of the workflow. As a result, the convenience of the workflow may be improved.

Further, the user may upload one file in two or more monitoring targets to execute two or more workflows associated to one file in parallel.

Further, the cloud storage 40 may be accessible from outside the workplace in which the delivery management server 10 is placed. Accordingly, the user may be able to execute a desired one of the workflows by uploading a file in the cloud storage 40 from the user's house or the user's business trip destination.

Note that the embodiment may be applied to a storage other than the storage provided over the cloud. For example, the embodiment may be applied to a file server over a local area network (LAN). In this case, the cloud input plugin 124 may execute a process similar to that executed by the folder input plugin 123.

Meanwhile, in the above example, the user needs to have information about the cloud storage 40 and the account corresponding to the desired one of the workflows. In this case, when the number of alternatives (the number of combinations of the cloud storage 40 and the account that may be uploaded) is increased, it may be difficult to specify one of the accounts for executing the desired workflow with which a file is uploaded in a desired one of the cloud storage 40.

To overcome such difficulty, the flow ID may be included in a filename of the file to be uploaded. In this case, even though a file is uploaded in the same cloud storage 40 by using the same account, mutually different workflows may be executed on the uploaded file based on the flow ID included in the file name. That is, when the user has information about an account with respect to one cloud storage 40, the user may be able to execute two or more workflows.

Figure 13:
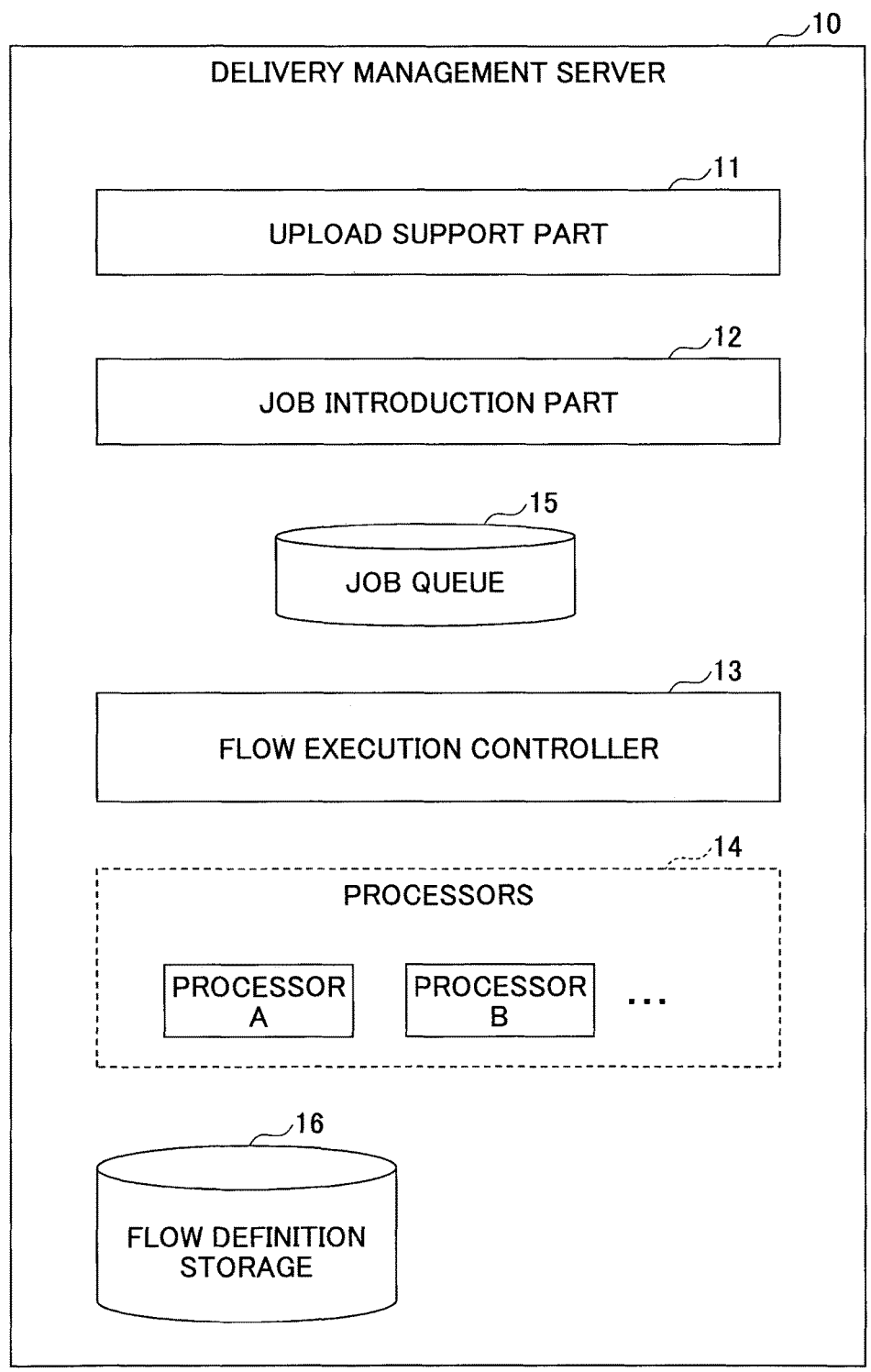
FIG. 13 is a diagram illustrating a second functional configuration example of the delivery management server in the embodiment.

Alternatively, the delivery management server 10 may include a functional configuration illustrated in FIG. 13. FIG. 13 is a diagram illustrating a second functional configuration example of the delivery management server in the embodiment. In FIG. 13, parts identical to those illustrated in FIG. 3 are provided with the same reference numbers, and duplicated illustrations are omitted from the specification.

In FIG. 13, the delivery management server 10 further includes an upload support part 11. The upload support part 11 is configured to implement a process to support uploading the file in the cloud storage 40 so as for the user to execute the desired workflow. Note that the upload support part 11 is implemented by the programs installed in the delivery management server 10 to cause a CPU 104 to execute processes.

Figure 14:
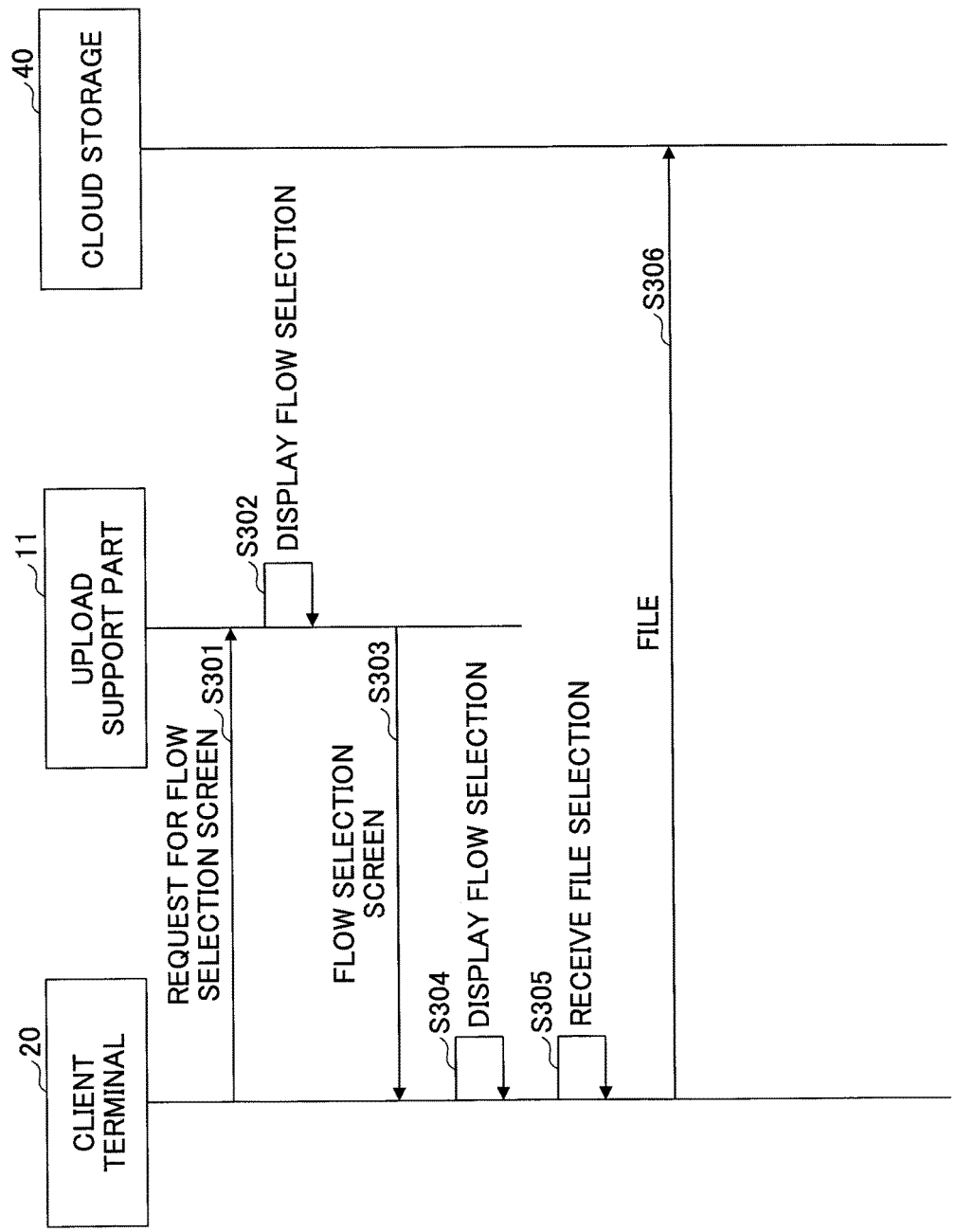
FIG. 14 is a sequence diagram illustrating an example of a process executed by an upload support part.

FIG. 14 is a sequence diagram illustrating an example of a process executed by the upload support part 1.

In step S301, the client terminal 20 transmits a flow selection screen acquisition request to the upload support part 11 in accordance with the user's operation. The flow selection screen indicates a screen from which the user is caused to select the workflow subject to execution from the workflows relating to the flow ID associated with the cloud storage 40 and the account in the setting information storage 1247.

The user's operation may, for example, be inputting a uniform resource locator (URL) allocated to the upload support part 11 with respect to a Web browser of the client terminal 20. In this case, the flow selection screen acquisition request is transmitted via a hypertext transfer protocol (HTTP). Further, in this case, necessity of installing special-purpose applications in the client terminal 20 may be reduced.

The upload support part 11 refers to the setting information storage 1247 to generate display data of the flow selection screen (hereinafter called "flow selection screen data") in response to reception of the flow selection screen acquisition request (step S302). For example, the flow selection screen data may be generated by utilizing a hypertext markup language (HTML). Subsequently, the upload support part 11 transmits a response including the flow selection screen data to the client terminal 20 (step S303).

When receiving the response, the client terminal 20 displays a flow selection screen based on the flow selection screen data included in the response (step S304).

Figure 15:
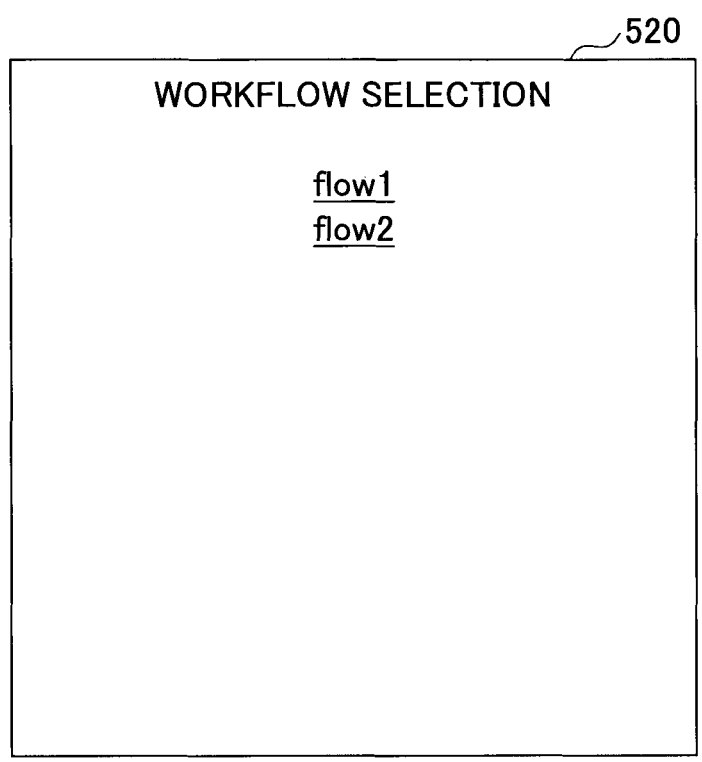
FIG. 15 is a diagram illustrating a display example of a flow selection screen.

FIG. 15 is a diagram illustrating a display example of flow selection screen. FIG. 15, the flow selection screen 520 includes the flow IDs stored in the setting information storage 1247 as alternatives. Note that respective captions of the workflows may be included in the alternatives, together with the flow IDs, or instead of the flow IDs. In this case, the above-described captions may be included in the respective setting information sets of the setting information storage 1247.

The respective alternatives of the flow selection screen 520 may be linked. When any one of the alternatives (the flow IDs) is selected, the client terminal 20 displays a file dialog in accordance with definitions of the flow selection screen data. The file dialog is used for selecting files from the file system of the client terminal 20. When the user selects any one of the files via the file dialog (step S305), the client terminal 20 uploads the selected file to the cloud storage 40 corresponding to the selected one of the alternatives in the flow selection screen 520 (step S306).

That is, the flow selection screen data describes the cloud storage 40 name, the account name, and the password of the cloud storage 40 corresponding to each of the alternatives. The above information is acquired from the setting information storage 1247 at the time of generating the flow selection screen data. The client terminal 20 executes the uploading of the file in the cloud storage 40 relating to the cloud storage 40 name associated with the selected one of the alternatives by utilizing the account name and the password associated with the selected alternative.

By perform the process of FIG. 14, the user may be able to upload files without having to pay attention to the cloud storage 40 and the account corresponding to the desired workflow.

Note that a screen displaying a list including items of the flow ID, the storage name corresponding to the storage name, the account name, and the password may be provided instead of the flow selection screen 520. The user may be able to easily detect the storage name corresponding to the desired workflow, the account name, and the password by referring to such a screen. The above-described screen may be generated by referring to the setting information storage 1247.

Note that in the present embodiment, the delivery management server 10 is an example of the apparatus configured to execute a data process with respect to input data. The delivery management server 10 may be implemented by an information-processing apparatus such as a server apparatus, a PC, and the like, or the functions of the delivery management server 10 may be implemented by an information processing system configured to include one or more delivery management servers 10.

The client terminal 20 is an example of a terminal apparatus configured to execute a process of saving data such as files in a storage service provided on the network in accordance with the user's operations. The cloud storage 40 is a storage destination in which the client terminal 20 stores data such as files, and includes a storage part or a functional part for storing the data. The cloud storage 40 is configured to implement at least a function as a data storage device to save transmitted data.

Note that in this embodiment, a file is given as an example of data to be saved from the client terminal 20 to the cloud storage 40; however, data in formats other than a file format may be implemented. Data to be saved from the client terminal 20 to the cloud storage 40 may include, in addition to data at least being subject to data processing, information utilized as control parameters for controlling process contents when executing a data process, or parameter information capable of specifying information utilized as control parameters. Further, the data subject to data processing may include the parameter information. That is, the target files are examples of data subject to processing, and the document information such as a file name, an extension, and an employee's number of the user indicates an example of the parameter information. In addition, the information (e.g., the superior's ID) acquired based on the parameter information such as the employee's number of the user is an example of information that may be used as the control parameters.

The file acquisition part 1242 is an example of a first acquisition part configured to acquire data that are saved from the terminal apparatus into the data storage device in accordance with the user's operations via the network. Further, the file acquisition part 1242 (the first acquisition part) is configured to acquire data saved in a specified acquisition destination based on the information specifying the specified acquisition destination set in advance.

The file analysis part 1243 is an example of a second acquisition part configured to acquire or extract parameter information based on the data acquired from the acquisition destination, acquire the parameter information based on information extracted from the acquired data, and/or acquire the parameter information based on a file name of the acquired data. The parameter information acquired by the second acquisition part is not necessarily used as the control parameters, or the information acquired based on the parameter information is not necessarily used as the control parameters (though they may be used as the control parameters depending on the contents of the data processes to be executed); however, these information sets are used as the control parameters in at least any one of the data processes, or used as information for acquiring the control parameters.

The flow selector 1244 is an example of a selector configured to select (determine) a data process to be executed with respect to the data subject to processing. The flow selector 1244 (the selector) is configured to determine a data process to be executed based on information associated with the data or parameter information acquired from the acquisition destination. That is, the flow selector 1244 (the selector) is configured to select a data process to be executed based on the storage destination (the acquisition destination) that stores the acquired data in the predetermined storage.

The user information acquisition part 1245 is an example of a third acquisition part configured to acquire information based on the data acquired from the acquisition destination. The user information acquisition part 1245 is an example of the third acquisition part configured to execute an acquisition process of acquiring information associated with parameter information of the data acquired from the information such as the user information stored in the predetermined storage area. The parameter information acquired by the third acquisition part is not necessarily used as the control parameters, (though they may be used as the control parameters depending on the contents of the data processes to be executed); however, these information sets are used as the control parameters in at least any one of the data processes.

Note that the above-described three acquisition parts are identified with being referred to as the "first acquisition part", the "second acquisition part", and the "third acquisition part".

The job information generator 1246 is an example of a process information generator configured to generate process information for executing the data process with respect to the data subject to processing, in accordance with the selected data process, the parameter information or the information acquired based on the parameter information. That is, the job information generator 1246 (the process information generator) is configured to generate process information serving as information for executing the data process based on the acquired data, the acquired parameter information, and the selected data process. Further, the data process with respect to the data subject to processing are executed in accordance with the process information. Note that the process information generator is not necessarily capable of identifying (recognizing) as to which information is used as the control parameters among parameter information sets or information sets acquired based on the parameter information. That is, whether the parameter information sets or the information sets acquired based on the parameter information are used as control parameters in the actual data processing may depend on which of the control parameters is required when the processors 14 execute the process, and hence which parameter is used may be specified by a corresponding one of the processors 14. Accordingly, since the process information generator generates process information set as the parameter information sets or the information sets acquired based on the parameter information, these information sets may be used as the control parameters in the subsequent data processes.

Note that the file name is an example of an identification name of the data.

The embodiments of the present invention are described above. However, the present invention is not limited to the specifically disclosed embodiments, and variations and modifications may be made without departing from the scope of the present invention.

In the above embodiments, the present invention is illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

The present application is based on and claims the benefit of Priority of Japanese Patent Application No. 2014-052943 filed Mar. 17, 2014, the entire contents of which are hereby incorporated herein by reference.

DESCRIPTION OF THE REFERENCE NUMERALS

1 Delivery management system
10 Delivery management server
11 Upload support part
12 Job introduction part
13 Flow execution controller
14 Processors
15 Job queue
16 Flow definition storage
20 Client terminal
30 User information management server
40 Cloud storage
100 Drive device
101 Recording medium
102 Auxiliary storage device
103 Memory device
104 CPU
105 Interface device
121 Scan input plugin
122 Mail input plugin
123 Folder input plugin
124 Cloud input plugin
1241 Setting part
1241 File acquisition part
1243 File analysis part
1244 Flow selector
1245 User information acquisition part
1246 Job information generator
1247 Setting information storage
B Bus

RELATED ART DOCUMENT

Patent Document

Patent Document 1
Japanese Laid-open Patent Publication No. 2012-065006

The invention claimed is:

1. An information processing system including one or more computers, the one or more computers comprising:
   a processor; and
   a memory that includes instructions, which when executed, cause the processor to execute the following steps:
   monitoring presence or absence of uploaded files with respect to a storage subject to monitoring, and acquiring an uploaded file when the presence of the uploaded file is detected;
   extracting document information from the acquired uploaded file;
   selecting a workflow to be executed on the file, based on an acquisition destination from which the file is acquired, or the document information of the file; and
   generating job information based on the document information and the file,
   wherein, upon receiving, from a terminal apparatus, a flow selection screen request, the flow selection screen being updated to indicate a screen from which a user selects the workflow subject to execution, the processor refers to the memory to generate display data of the flow selection screen and transmits a response including the flow selection screen data to the terminal apparatus, and
   wherein, in the memory, identification information for identifying the storage is associated with identification information for identifying the workflow, and the flow selection screen includes alternatives and the identification information for identifying the storage corresponding to each of the alternatives.

2. The information processing system as claimed in claim 1, wherein the steps executed by the processor further include:
   extracting the document information including a file name, a file name extension, and an employee's number at a workplace of the user, the employee's number being included in the file name, and
   wherein the employee's number is user identification information.

3. The information processing system as claimed in claim 1, wherein the steps executed by the processor further include:
   handling information acquired from a file name of the acquired file in accordance with a predetermined rule as user identification information.

4. The information processing system as claimed in claim 1, wherein the steps executed by the processor further include:
   selecting a prestored identifier of the workflow associated with the monitored storage serving as an acquisition destination of the acquired file as a flow ID of the workflow to be executed on the acquired file.

5. The information processing system as claimed in claim 1, wherein
   the user identification information includes a superior's ID that is an employee's number of the user's superior, and the workflow is configured to cause delivery to an email address of the superior specified based on the superior's ID.

6. An information processing apparatus comprising:
   a processor; and
   a memory that includes instructions, which when executed, cause the processor to execute the following steps:
   monitoring presence or absence of uploaded files with respect to a storage subject to monitoring, and acquiring an uploaded file when the presence of the uploaded file is detected;
   extracting document information from the acquired uploaded file;
   selecting a workflow to be executed on the file, based on an acquisition destination from which the file is acquired, or the document information of the file; and
   generating job information including setting information, the document information, the file and user identification information,
   wherein, upon receiving, from a terminal apparatus, a flow selection screen request, the flow selection screen being updated to indicate a screen from which a user selects the workflow subject to execution, the processor refers to the memory to generate display data of the flow selection screen and transmits a response including the flow selection screen data to the terminal apparatus, and
   wherein, in the memory, identification information for identifying the storage is associated with identification information for identifying the workflow, and the flow selection screen includes alternatives and the identification information for identifying the storage corresponding to each of the alternatives.

7. The information processing apparatus as claimed in claim 6, wherein the steps executed by the processor further include:
   extracting the document information including a file name, a file name extension, and an employee's number at a workplace of the user, the employee's number being included in the file name, and wherein
   the employee's number is user identification information.

8. The information processing apparatus as claimed in claim 6, wherein the steps executed by the processor further include:
   handling information acquired from a file name of the acquired file in accordance with a predetermined rule as user identification information.

9. The information processing apparatus as claimed in claim 6, wherein the steps executed by the processor further include:
   selecting a prestored identifier of the workflow associated with the monitored storage serving as an acquisition destination of the acquired file as a flow ID of the workflow to be executed on the acquired file.

10. The information processing apparatus as claimed in claim 6, wherein
    the user identification information includes a superior's ID that is an employee's number of the user's superior, and the workflow is configured to cause delivery to an email address of the superior specified based on the superior's ID.

11. A data process control method implemented by an information processing system, the information processing system including one or more computers, the data process control method comprising:
    monitoring, by the one or more computers, presence or absence of uploaded files with respect to a storage subject to monitoring, and acquiring, by the one or more computers, a uploaded file when the presence of the uploaded file is detected,
    extracting, by the one or more computers, document information from the acquired uploaded file;
    selecting, by the one or more computers, a workflow to be executed on the file, based on an acquisition destination from which the file is acquired, or the document information of the file; and generating, by the one or more computers, job information including setting information, the document information, the file and user identification information, wherein, upon receiving, by the one or more computers from a terminal apparatus, a flow selection screen request, the flow selection screen being updated to indicate a screen from which a user selects the workflow subject to execution, the one or more computers refer to a memory of the one or more computers to generate display data of the flow selection screen and transmit a response including the flow selection screen data to the terminal apparatus, and wherein, in the memory, identification information for identifying the storage is associated with identification information for identifying the workflow, and the flow selection screen includes alternatives and the identification information for identifying the storage corresponding to each of the alternatives.

12. The data process control method as claimed in claim 11, further comprising:

extracting, by the one or more computers, the document information including a file name, a file name extension, and an employee's number at a work place of the user, the employee's number being included in the file name, and wherein the employee's number is user identification information.

13. The data process control method as claimed in claim 11, further comprising:

handing, by the one or more computers, information acquired from a file name of the acquired file in accordance with a predetermined rule as user identification information.

14. The data process control method as claimed in claim 11, further comprising:

selecting a prestored identifier of the workflow associated with the monitored storage serving as an acquisition destination of the acquired file as a flow ID of the workflow to be executed on the acquired file.

15. The data process control method as claimed in claim 11, wherein the user identification information includes a superior's ID that is an employee's number of the user's superior, and the workflow is configured to cause delivery to an email address of the superior specified based on the superior's ID.

\* \* \* \* \*